United States Patent [19]

Valentine

[11] 4,009,524

[45] Mar. 1, 1977

[54] EDUCATIONAL DEVICE FOR LEARNING FUNDAMENTALS OF ENGINE OPERATION

[75] Inventor: Charles G. Valentine, Stamford, Conn.

[73] Assignee: Xerox Corporation, Stamford, Conn.

[22] Filed: Apr. 19, 1973

[21] Appl. No.: 352,774

[52] U.S. Cl. .................................. 35/13; 35/7 A; 40/142 A
[51] Int. Cl.² ........................................ G09B 25/02
[58] Field of Search ............. 35/2 R, 2 A, 9 R, 9 A, 35/9 B, 10, 11, 13, 19 R, 19 A, 28, 48 R; 40/142 A

[56] References Cited

UNITED STATES PATENTS

| | | | |
|---|---|---|---|
| 1,270,369 | 6/1918 | Bishop | 35/13 X |
| 2,008,634 | 7/1935 | Aird | 35/13 |
| 2,996,802 | 8/1961 | De Masi et al. | 33/1 |
| 3,077,696 | 2/1963 | Barnett et al. | 35/19 A X |
| 3,245,156 | 4/1966 | De Bloois et al. | 35/8 A |
| 3,380,177 | 4/1968 | Wagner | 35/24 R |
| 3,423,846 | 1/1969 | Arend | 35/19 A |
| 3,514,873 | 6/1970 | Stobbe | 40/142 A X |
| 3,520,074 | 7/1970 | Severin et al. | 35/48 R |
| 3,538,626 | 11/1970 | Frank | 35/48 R |
| 3,651,592 | 3/1972 | McCormick et al. | 40/142 A |

OTHER PUBLICATIONS

Chrysler Motors Corporation, "Dodge Service Manual," 1968, p. 9–2.

*Primary Examiner*—Anton O. Oechsle
*Assistant Examiner*—Vance Y. Hum

[57] ABSTRACT

An educational kit for teaching the internal combustion engine is disclosed. The kit comprises an instructional system, a simulator board upon which is graphically depicted two schematic sectional views of the cylinder portion of a four stroke cycle internal combustion engine, and a plurality of pieces upon which are graphically depicted various of the major parts which constitute the internal mechanism of the engine.

6 Claims, 7 Drawing Figures

AUDIO VISUAL MEANS

WORK SHEETS

EDUCATIONAL DEVICE FOR LEARNING FUNDAMENTALS OF ENGINE OPERATION

BACKGROUND OF THE INVENTION

The present invention relates to an educational kit designed for training in automotive technology. More specifically, the invention deals with an educational learning kit designed to help students of automotive technology understand the assembly, relationship of parts and operation of an internal combustion engine.

The automobile is a fairly complex piece of machinery constructed from many complex subsystems. When these subsystems are operating properly and cooperating with one another as they should, a pleasurable drive in the country is there but for the taking. However, when one or more of these subsystems malfunctions, a pleasurable drive in the country often becomes both a regrettable experience for the automobile owner and a delight to the automobile repairman.

Traditionally, an individual interested in automobile technology might avail himself of the opportunity to acquire the skills necessary for the occupation of automobile mechanic or repairman by any one of a number of routes. Often, such skills are acquired by attending trade schools, by taking courses in automotive technology, through military service training, by simple on-the-job training, or by self-training. Regardless of the route taken, the first goal which should be achieved is an understanding of the automobile and its component subsystems, and how each of these subsystems cooperate with one another to achieve a desired result. A second goal is an understanding of specific subsystems, including how they operate, what parts make up the subsystems, how these parts are assembled and how these parts relate to one another. Once these goals have been achieved, the individual is better equipped for training in diagnosis and repair of the various malfunctions occurring in automobile subsystems.

At some point during the learning process, it is most desirable that the student of automobile repair extend beyond charts, manuals or diagrams and be afforded the opportunity to see, examine and manipulate the actual subsystem under study or a model thereof. Physical exposure to the subsystem and its component parts aids the student in better understanding what he hears or reads about it, and complements the learning process by permitting him to inspect, manipulate and arrange the various parts.

Recent years have marked the introduction of a number of educational teaching devices generally aimed at the pre-college or pre-high school age group. The most common of these are the mechanical or computer devices designed to be used by individual students. The theory behind the increasing use of such devices is that account is made of the individual differences in ability, speed and grasp of subject matter, thereby permitting the student to learn at his own pace with minimum supervision by the teacher. Some of these devices also introduce new dimensions into the learning process wherein, for example, spelling may be associated with pictures of objects, mathematical concepts associated with the relative sizes and shapes of objects, or correct responses to questions posed by a computer rewarded by permission to proceed.

The advantages of a teaching method using a device geared for the individual should not be considered restricted to elementary school subjects; occupational learning materials that take into account individual differences in ability, speed and grasp of subject matter also have a better chance of being effective. However, at the present time there are very few educational devices available to the community colleges, vocational high schools and otherspecial schools where various types of mechanical and electrical technologies are sought to be taught on a simplified and individualized basis. There is a great need for occupational learning devices which can be used by the individual student while learning a particular technology and which permit the student to physically simulate the construction or arrangement of parts or concepts involved in the particular systems or subsystems under study prior to examination of the actual system or subsystem.

Accordingly, it is an object of this invention to provide a novel approach toward the learning of automobile systems and subsystems.

Another object is to provide an educational kit comprising instructional means and simulator means for teaching the internal mechanism and operation of an internal combustion engine.

Another object is to provide an occupational educational kit which is simple, relatively inexpensive, rugged, easily assembled, relatively portable and easily understood.

Another object is to provide an educational kit designed for use by individual students comprising audio, visual or audio-visual instructional means, a simulator board, and pieces representative of the internal parts of an automobile engine, whereby the student may manipulate the pieces on the simulator board in response to said instructional means to graphically depict the assembly, relationship of parts and operation of an automobile engine.

SUMMARY OF THE INVENTION

In accordance with the teachings of the present invention, a simple and effective educational unit for the teaching of the assembly, relationship of parts and operation of an internal combustion engine is provided. The unit comprises an instructional means, a simulator board upon which is graphically depicted two schematic sectional views of the cylinder portion of a four stroke cycle internal combustion engine, and a plurality of pieces upon which are graphically depicted various of the major parts which constitute the internal mechanism of the engine. The unit may also comprise a display board which provides for storage and easy access to the various pieces when the unit is in use. The unit is designed to present the fundamentals of the function, mechanism and operation of an internal combustion engine using a programmed, multimedia approach whereby the student hears and sees information, performs by answering questions, solving problems and manipulating objects. The unit is designed for individual use or use by small groups without the need for extensive supervision or participation by an instructor. It permits the student to learn at his own pace, and also affords him the chance to capitalize on the way he learns best because he participates in different kinds of learning experiences. He listens to information while viewing a series of related visuals and participates in a manipulative activity which gives him a chance to try doing himself what he has been shown or told how to do. He is thus totally involved in the learning process.

DETAILED DESCRIPTION OF THE INVENTION

The instructional means employed in the unit is an audio-visual presentation using slides or filmstrips in conjunction with a descriptive audio account of the visuals. The visual materials are synchronized with the audio presentation. A recorded narrator provides background information descriptive of the internal combustion engine, what its function is, how it operates, the component parts thereof and how these parts are assembled. During this audio presentation, a series of synchronized visuals are shown to the students. These visuals comprise photographs or diagrams of the various components of the four cycle engine including the cylinder, combustion chamber, piston, the connecting rods, the crankshaft and the valves. The visuals also schematically depict how these parts are assembled, how they relate to each other, and how they function during the combustion process to power a mechanism such as an automobile.

The audio-visual equipment needed will vary depending on the type of instruction to be given. A rear screen projector for small groups, or a projector and screen for a classroom presentation may be used. For the audio presentation, either visual projection equipment with built-in audio capability or a separate cassette recorder may be used. The instructional means provided with the educational kit includes a visual segment available, for example, on 35mm slides or filmstrips, and an audio segment available on cassettes. The supporting equipment is normally not included.

At various points during the presentation the student is requested to stop the audio-visual presentation and perform certain activities using the simulator board and pieces associated therewith. He may be requested to assemble a series of pieces representative of a piston and valves in accordance with a pictured diagram or to manipulate and arrange the various pieces to represent the positions of the piston and valves during the intake, compression, ignition, power and exhaust stages of the engine operation. The simulator activity allows a student to actually use his hands as a learning tool as well as his eyes and ears. By performing an activity using the simulator board and its accessories, the student takes an active part in the learning process and achieves understanding more quickly.

The simulator board and the accessories are best described with reference to the attached drawings.

DETAILED DESCRIPTION OF THE DRAWINGS

Figure 1:
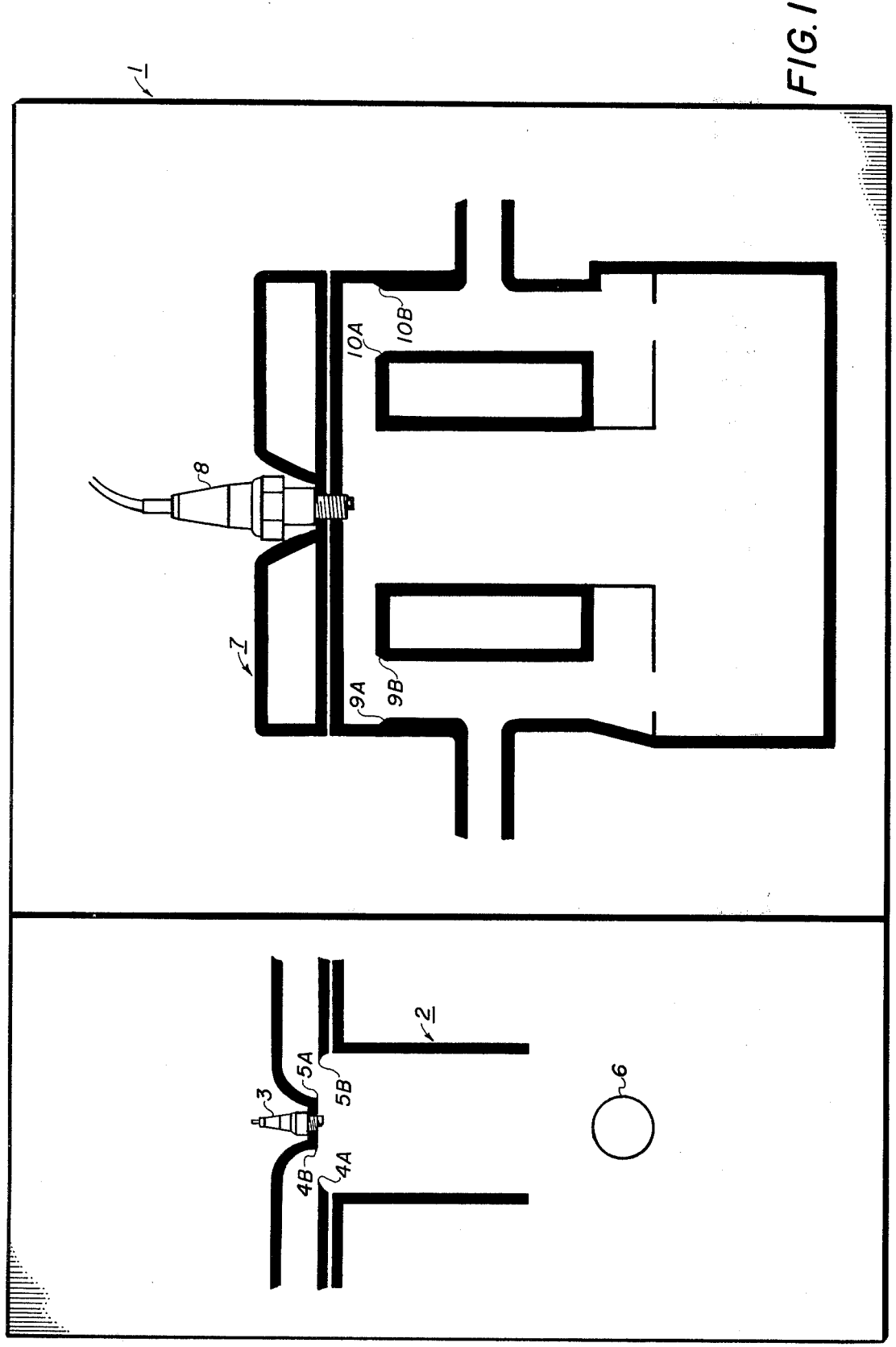
FIG. 1 is a plan view of the simulator board with graphic indicia thereon.

In FIG. 1, a simulator board 1 is shown having printed on the left section thereof graphic indicia 2 representative of a schematic sectional view of the cylinder portion of a four stroke cycle internal combustion engine. Also depicted is a spark plug 3 and two valve openings, one from the intake manifold defined by the space between walls 4A and 4B and the other to the exhaust manifold defined by the space between walls 5A and 5B. Also shown is a circle 6 centrally located under the cylinder portion which represents the center of the crankshaft. On the right side of the simulator board is printed graphic indicia 7 representative of a schematic sectional view of a single cylinder engine, including the spark plug 8, intake valve opening defined by the space between walls 9A and 9B and exhaust valve opening defined by the space between walls 10A and 10B. Other areas within indicia 7 are adapted for the application of manipulative pieces representative of the piston, crankshaft, valves, camshaft, and timing gears as will be hereinafter described. The simulator board may be constructed of a magnetically attractive sheet of rigid material such as ferrous metal or a magnetic ferrite plastic, or a thin sheet of ferrous metal coated with a thin layer of plastic material. The surface of the board is painted with a neutral background color such as a white or yellow enamel. The graphic indicia present on the board may be printed over the enamel in a suitable contrasting color such as black. Printing may be accomplished by any suitable means such as, for example, a silk screening process. Alternatively, the indicia may be printed on a sheet of clear plastic adapted to be superimposed over a blank board. Although the simulator board may consist solely of a thin sheet of material with suitably smooth edges, the sheet is preferably laminated to a suitable backing member which imparts suitable rigidity thereto. Thus, in the preferred embodiment the simulator board comprises a thin sheet comprising ferrous metal having a thickness of about 1/32 inch laminated to a backing member made from a rigid material such as fiberboard, or a resinous material, said backing material having a preferred thickness of about 1/4 inch. The dimensions of the simulator board should be such that the board can be conveniently used by the student at a given workplace. Boards having dimensions of about 15 × 20 inches, or approximately 300 square inches, are particularly suitable.

Figure 2:
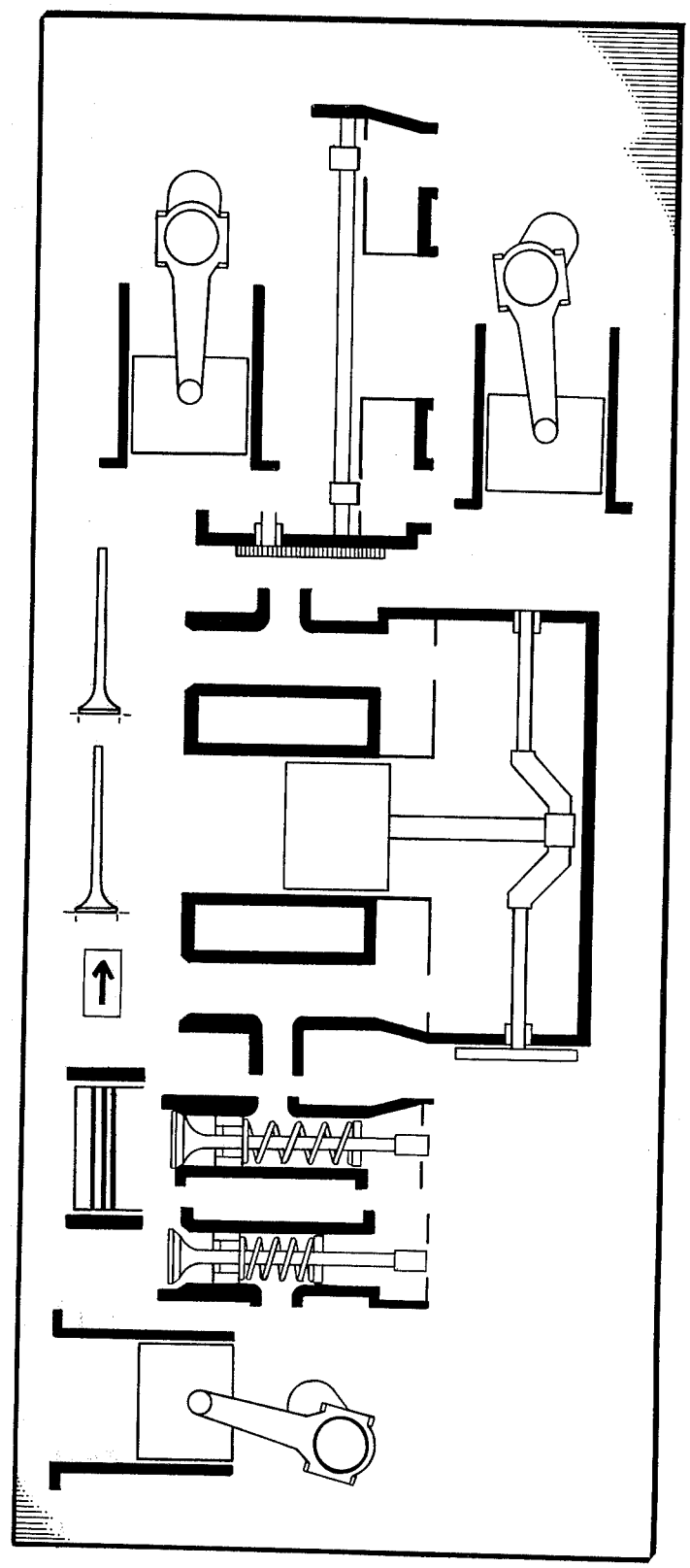
FIG. 2 is a plan view of the display board with graphic indicia thereon.

In FIG. 2 a display board is shown having printed thereon graphic indicia representative of pistons, valves and other parts of an internal combustion engine. The display board is also constructed on a magnetically attractive rigid material similar to the simulator board and the background indicia may be printed thereon in the same way. The purpose of the display board is to serve as a display and storage area for the magnetically attractive pieces which are used in conjunction with the simulator board. Each of the graphic indicia printed on the display board corresponds to the indicia printed on one of the pieces, thereby facilitating systematic storage and display of the pieces and allowing for quick inspection to determine that all of the pieces are accounted for. The edges of the board should be either smooth or rolled over to prevent injury from sharp edges.

Figure 3:
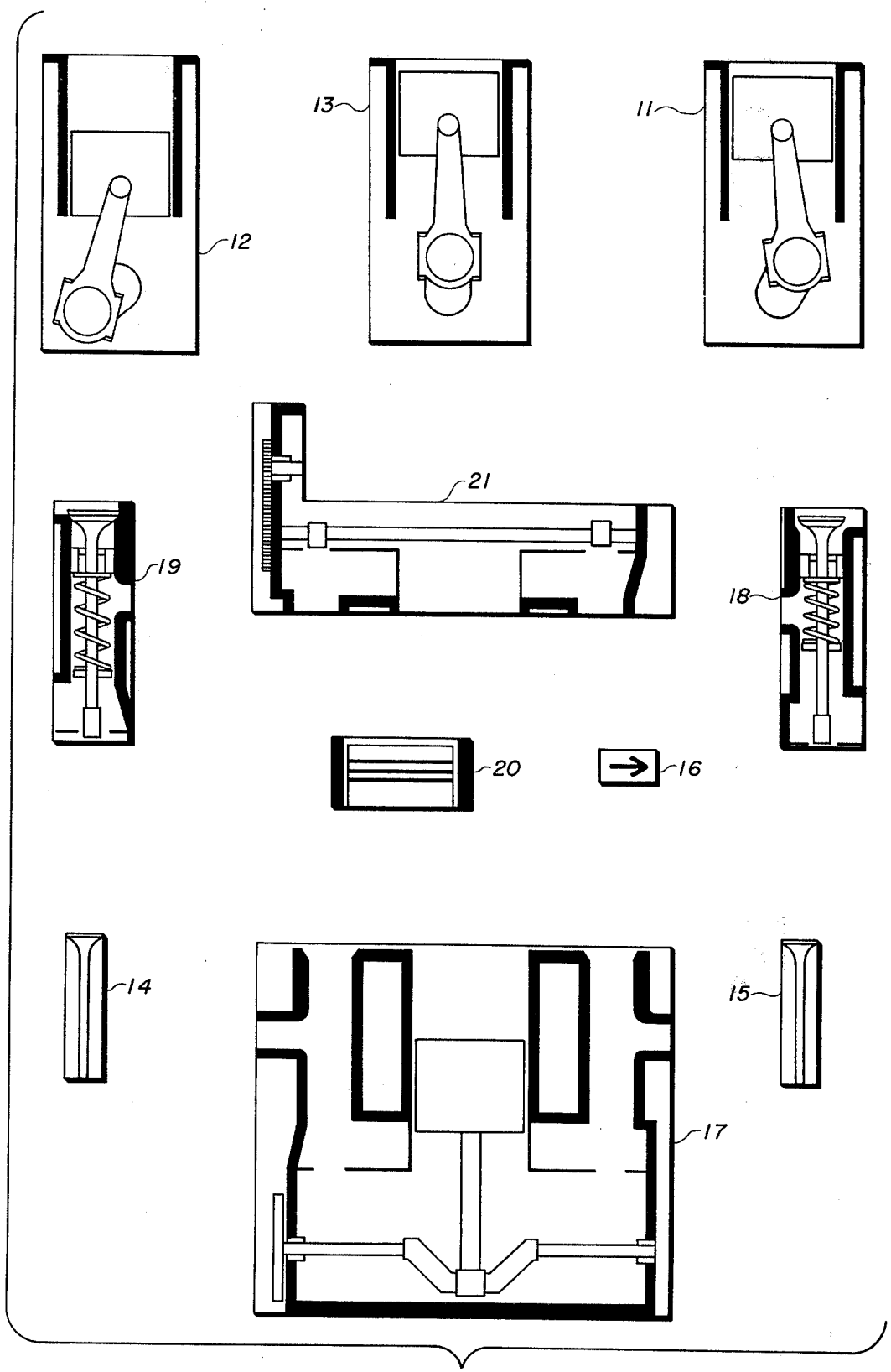
FIG. 3 is a plan view of the manipulative pieces having graphic indicia thereon representative of the various parts of the internal combustion engine and positions of parts during the various cycles of operation.

The manipulative pieces used in the educational kit are shown in FIG. 3. Each of these pieces consists of a flat sheet of a rigid material such as metal or plastic upon which is printed one of several indicia representative of pistons and valves in various operational positions, shafts and gears. In the preferred embodiment, the pieces are made of a plastic material such as polyvinylchloride having a thickness of about 1/16 inch and having smaller sections of a magnetically attractive material laminated to the underside thereof. The smaller sections also serve to provide a gap between the piece and the surface upon which it is resting to facilitate gripping and manipulation of the piece on flat surfaces.

The various pieces and indicia thereon are a piston and connecting rod 11 positioned to depict the beginning of the downward stroke, piston and connecting rod 12 positioned to depict the beginning of the upward stroke, and piston and connecting rod 13 depicting the position of the piston at ignition. Also included are pieces 14 and 15 having indicia representative of valves, and a piece having an arrow 16 thereon which is used to indicate the direction in which a piston is moving at any given time. The aforementioned pieces are designed to be used in conjunction with indicia 2 which is present on the left side of simulator board 1. Accordingly, these pieces and corresponding indicia are of a size and shape such that they fit within and can be manipulated in conjunction with indicia 2 on simulator board 1. The remaining pieces are designed to be used in conjunction with indicia 7 which is present on the right side of simulator board 1. Indicia depicted on these pieces are a schematic view 17 of a piston, connecting rod and crankshaft shown within a schematic sectional view of a single cylinder engine, intake valve 18 shown in the open position, and exhaust valve 19 shown in the closed or seated position. Also included is a piece 20 bearing indicia representative of the upper part of a piston wherein the piston rings are graphically depicted, and piece 21 bearing graphic indicia representative of the camshaft and timing gear mechanisms of the internal combustion engine. These latter pieces are of a size and shape such that they fit within and can be manipulated in conjunction with indicia 7 on simulator board 1.

Figure 4:
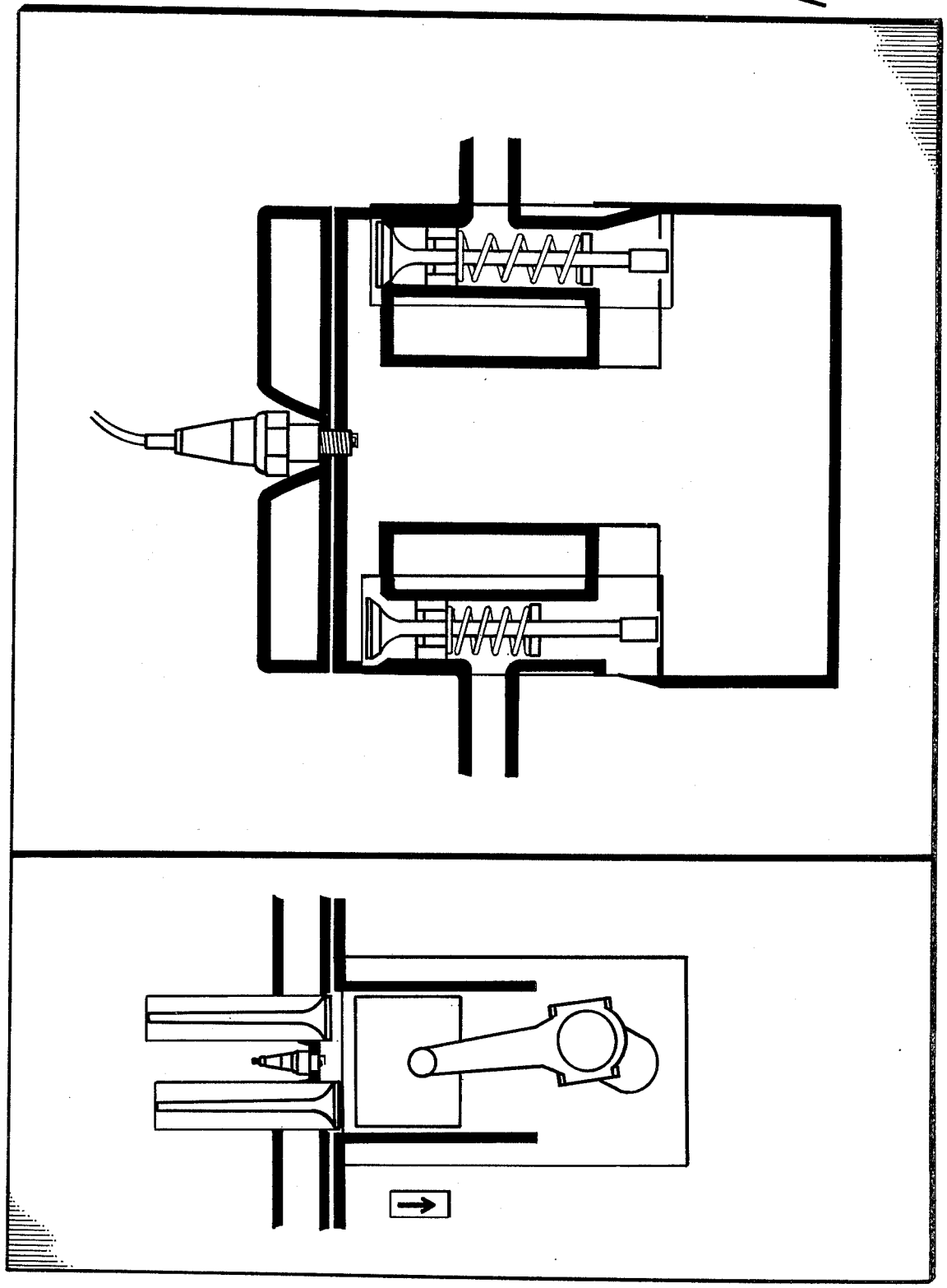
FIG. 4 is a plan view of the simulator board with certain of the manipulative pieces in place.
Figure 5:
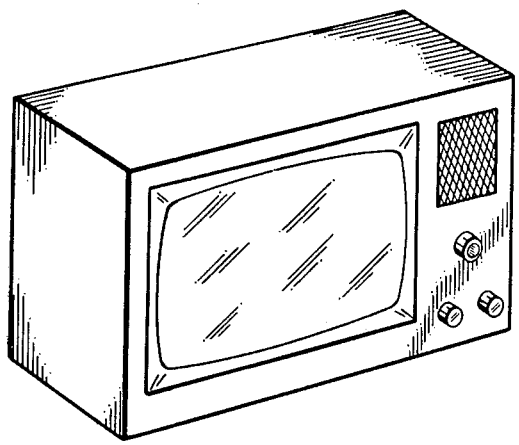
FIG. 5 illustrates generally an audiovisual device suitable for use in the present invention.
Figure 6:
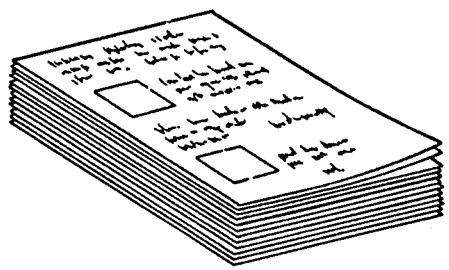
FIG. 6 illustrates generally worksheets in accordance with the present invention.
Figure 7:
FIG. 7 is a side-sectioned view of a typical manipulative piece in accordance with the invention showing smaller magnetic sections laminated to the underside of the piece.

In FIG. 4 simulator board 1 is depicted with some of the pieces in place. The left side of the board shows indicia 2 and the arrangement of piston 11 and valves 14 and 15 representative of the beginning of the intake stroke. The right side shows indicia 7 with valves 18 and 19 in place.

As indicated above, the surfaces of the simulator board, the display board and at least the bases of the manipulative pieces are made from or contain a magnetically attractive material. The term magnetically attractive material is intended to encompass a material that is either itself magnetic or a material that is attracted to a magnet. Thus, where the surface of the boards is magnetic, the bases of the pieces have laminated thereto a section of a magnetic material such as magnetic plastic or metal, and the boards are made of material that is attractive to a magnet such as galvanized steel.

All of the above materials are most conveniently supplied housed in a compartmentalized case for easy use and storage. Thus, the educational kit includes the simulator board, the display board, the manipulative pieces, the visual slides or tapes, and the audio cassette. The kit may also include student worksheets, sample tests or quizzes to be given by the instructor before and after use of the unit, and an instuctor's manual.

To illustrate how the educational kit is used, the audio-visual presentation begins with an introduction dealing with the automobile engine and a description of how straight line motion of the piston is changed to rotary motion by means of the crankshaft. This relationship is demonstrated using a child's tricycle as an example, wherein the knee of the child simulates the piston, the leg of the child simulates the connecting rod and the tricycle pedals and shaft simulate the crankshaft. Next, the student is introduced to the four basic steps involved in the operation of the engine; namely, the intake stroke, the compression stroke, the power stroke, and the exhaust stroke. During this discussion, the student is shown by means of visual diagrams the relative positions of the piston and connecting rod and the valves during each of these engine cycles. At certain points during the presentation, the student is asked to switch to the simulator board and accessories and reconstruct an assembly of pistons, valves, or other pieces as depicted in a video segment of the presentation. For example, the student might be asked to position the two valves and one of the three pieces representative of the piston on the left side of the board to depict the relative position of these pieces during one phase of the engine operation, say, the intake stroke as depicted in FIG. 4. During this phase, the intake valve should be placed in an open position, the exhaust valve in the closed position, and the piston should be beginning the downward stroke. Next, the student might be asked to depict compression by closing both valves and inserting a piston which is beginning the upward stroke. Other phases of engine operation can also be simulated by choosing the appropriate pieces and placing them in the proper positions on the simulator board. After further discussion concerning the roles of the timing gear and camshaft, for example, the student might then be asked to position the pieces representative of these parts within the confines of the indicia present on the right side of the board. Thus, by using the simulator board and the manipulative pieces, the student can reconstruct any of a number of relationships which graphically depict the operation and the relationship of the various parts which are present in the internal combustion engine, thereby permitting the student to demonstrate his understanding of the assembly and relationships of the internal parts present in an automobile engine.

The above described educational kit is programmed such that the student will encounter a minimum of frustration and a maximum of learning efficiency during use of the kit. Upon completion of the kit, the student should be able to define or describe in one sentence or less terms such as reciprocating motion, rotary motion, bore, stroke, throw, displacement, compression ratio, cylinder pressure, horsepower, torque, and the like. He should also be able to describe in one paragraph or less the functions occurring in a cylinder during each stroke of the four-stroke cycle; describe in two sentences or less the purpose and basic operation or reciprocating internal combustion engine components such as the piston, the crankshaft, the connecting rod, the bearings, the cyclinder, the combustion chamber, the carburetor, the valves, the piston rings, the timing gears, the flywheel, and the like; name the four strokes in the four-stroke cycle; list four common cylinder arrangements; and also list approximate fuel ratios for idling, cruising and maximum power conditions.

A complete description of the educational kit emcompassed by the present invention may be found in a booklet entitled "Fundamentals of Engine Operation — Automotive Technology" (Unit 10059–80) published as part of the Occupational Technology Series by the Xerox Corporation.

What is claimed is:

1. An educational kit programmed for teaching the internal combustion engine comprising as integrated component parts thereof:
   a. a simulator board having a surface of magnetically attractive material and having graphic indicia on the surface thereof including schematic sectional views of the cylinder portion of the internal combustion engine, the graphic indicia on said simulator board being the non-numerical board indicia as shown in FIG. 1;
   b. a plurality of magnetically attractive manipulative pieces individually bearing on their surfaces specific graphic indicia defining parts for said internal combustion engine including pistons, valves, and shafts and gears, said pieces including a plurality of pieces each bearing piston indicia indicating the different positions of a piston during the compression, ignition, combustion and exhaust cycles of an internal combustion engine, another plurality of said pieces bearing valve indicia for depicting valve positions during said engine cycles, said pieces adapted for positioning on said simulator board such that the indicia on said pieces complements the indicia on said board, and further adapted for sequential manipulation on said simulator board such that the assembly of parts and a plurality of operating conditions of said internal combustion engine may be simulated; said magnetically attractive board or alternatively each of said magnetically attractive pieces being magnetic to provide a mutual attraction between said board and said pieces, the graphic indicia on said manipulative pieces being the non-numerical piece indicia as shown in FIG. 3; and
   c. audio-visual instructional means including synchronized recordings and visual slides or filmstrips presenting information relevant to the internal combustion engine including information defining the relationship between the indicia on said pieces and the indicia on said simulator board; said audio-visual instructional means further characterized in that it is periodically stopable to permit the user to perform a manipulative activity requested by the instructional means using said simulator board and said manipulative pieces, and being restartable again by the user upon completion of the activity; whereby the assembly, relationship of parts and operation of an internal combustion engine may be simulated by positioning and manipulating said pieces on said simulator board in response to said instructional means.

2. An educational kit according to claim 1 further including a display board for said manipulative pieces comprising a sheet of magnetically attractive material, said display board having graphic indicia on a surface thereof in spaced relationship, said graphic indicia being substantially identical to the indicia present on each of said manipulative pieces, said manipulative pieces adapted for storage on and removal from said display board.

3. An educational kit according to claim 2 wherein said simulator board, said manipulative pieces, and said display board are constructed of a substantially rigid material.

4. An educational kit according to claim 1 wherein said manipulative pieces are magnetic.

5. An educational kit according to claim 4 wherein said manipulative pieces comprise a flat sheet of rigid material having smaller sections of a magnetic material laminated thereto.

6. An educational kit according to claim 1 wherein said instruction means includes a plurality of student worksheets, said worksheets being adapted for use by the student to record information and test the student in response to said audio-visual instruction means.

* * * * *